3,160,245
INTERLOCKED PANEL STRUCTURE
John Pavlecka, 8797 Capital, Oak Park, Mich.
Filed May 26, 1960, Ser. No. 32,509
36 Claims. (Cl. 189—34)

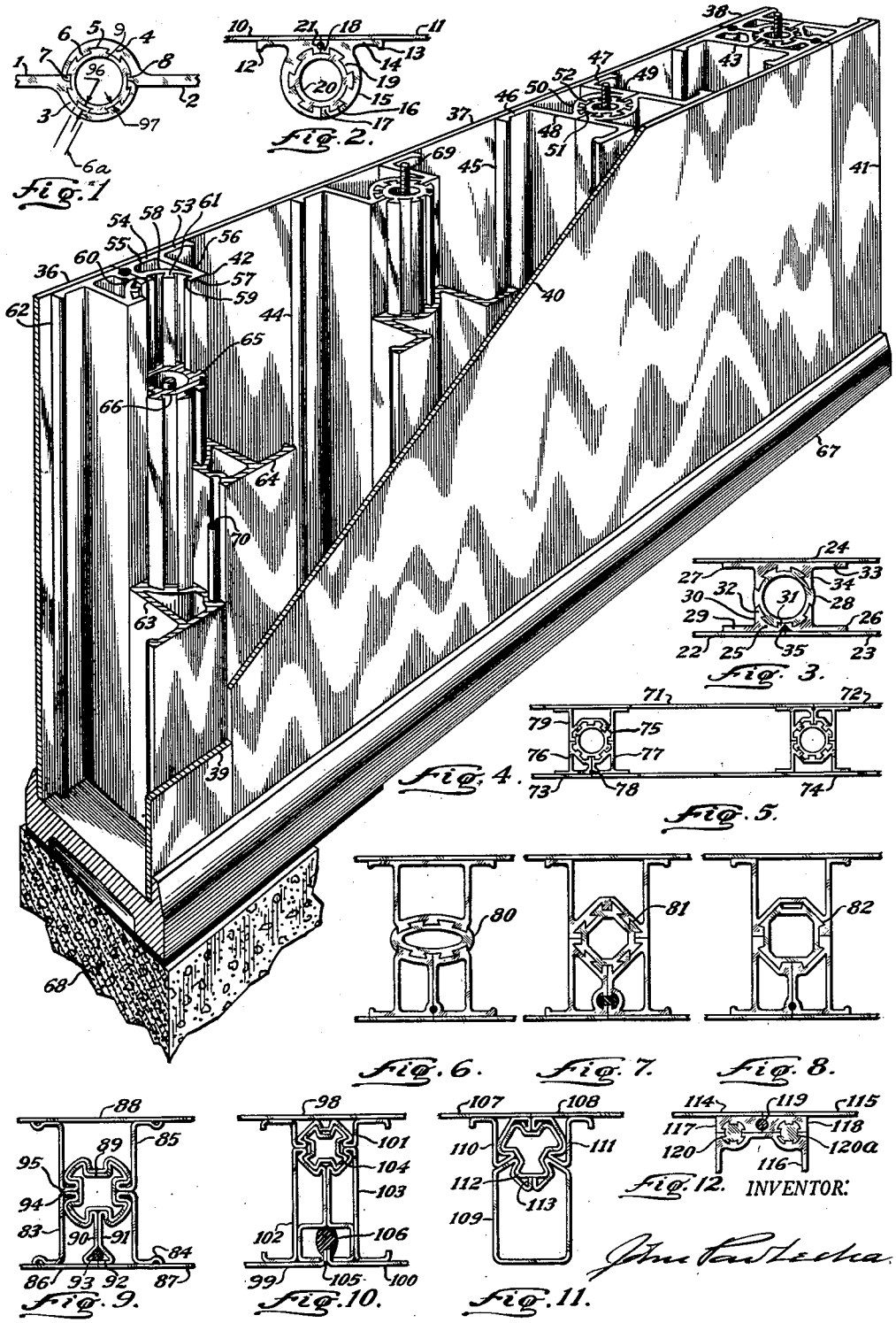

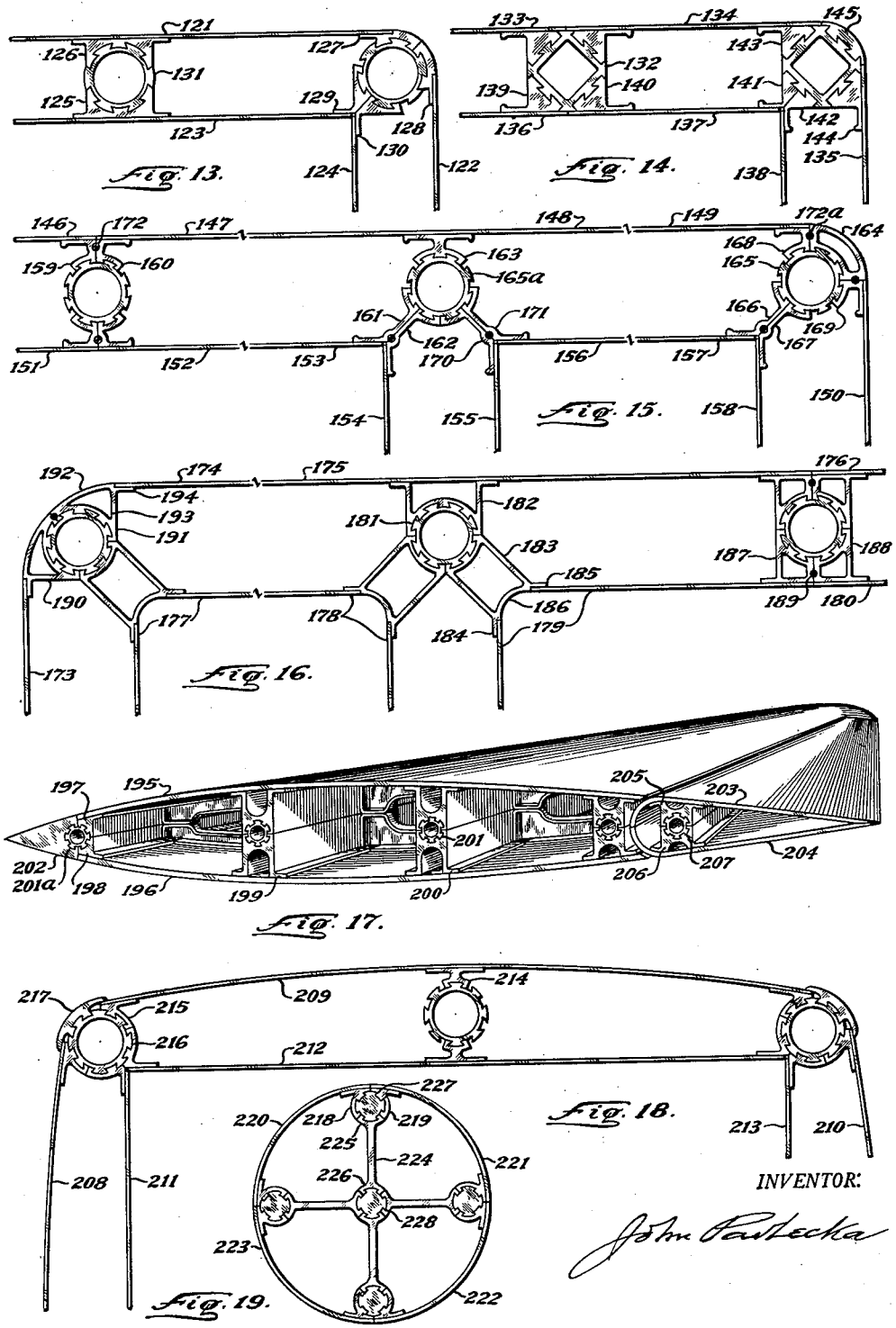

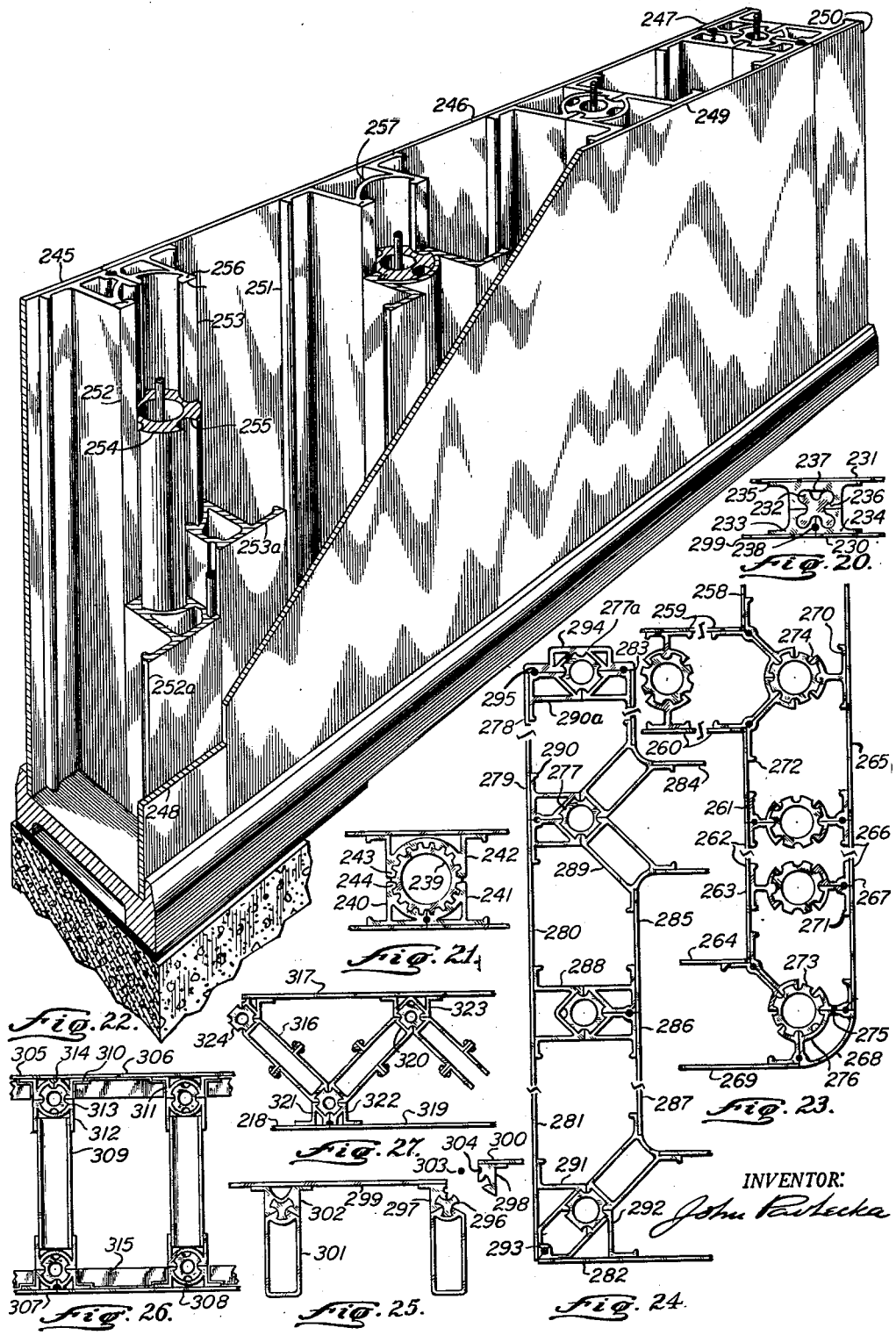

This invention relates to such structures as building walls, floors, partitions, cabinets, containers, vans, busses, bill boards, aircraft wings and control surfaces, in general, and more particularly to a novel type of such structures wherein adjoining as well as facing panels, or panels and associated stress members, are interlocked into unity by linear mortised keys or splines.

It is an object of this invention to devise a structure of the aforementioned type which is fabricated as fully finished individual components or panel units, and in certain cases also stress members such as studs, joists, spars, etc., and then is assembled—or later on disassembled for repair, inspection, or relocation—with a minimum amount of labor and tools by telescoping linear interlocking keys into engagement with the components.

Another object is a structure of hollow wall such as has, by its nature, an inaccessible interior, and which is distinguished by a rapid and simple manner of assembly as well as by a smooth and unblemished exterior with a minimum of parting lines or seams, tightly closed and sealed, such as is essential for appearance in most applications and for aerodynamic reasons in others.

A further object is a structure of hollow and inaccessible walls producible with complete accessibility as separate panel units from sheets or plates and extruded or rolled shapes, and with such advantageous processes as resistance welding and adhesive bonding, whereby building construction becomes primarily a manufacturing operation, and wing fabrication is reduced from a piece-by-piece and rivet-by-rivet handiwork into several production steps.

Another object is to devise a union for thin panels which normally lack strength in all directions, by providing them with webbed stiffeners or stringers as auxiliary stress members, and making use of the stringers as carriers of lengthwise tenoned segmental sockets, and by telescoping linear grooved keys into the sockets cause them to become substantially immobile in the transverse and angular directions, thereby constraining the stringers to function as a unitary stress member for the thin panels besides cojoining them in either adjoining or facing relationship, or in both such relationships.

A still further object is a relatively immobile interlocked union of stringers on thin panels by forming the stringers with lengthwise tenoned segmental sockets, and telescoping a linear key into engagement with the sockets, the key being either grooved, fluted, or preferably mortised so as to provide it with a dovetail mortise and tenon profile and with shallow mortises and low tenons for maximal strength in transverse tension and in torsion, and for an effective engagement with the stringer sockets.

Another object is a wall structure subject to loads against its sides as well as parallel with them, in which the widest panels available can be used for reducing the number of seams, the panels being backed up by stringers integral with them, or by individual stress members such as studs, spars, joists, etc., in addition and in opposition to the stringers, the stringers being interlocked by linear mortised keys either directly with each other or with the stress members, thereby to cojoin the panels both edge-to-edge and in spaced apart facing relationship, as well as to give rise jointly to stress members for the panels at modular intervals.

A further object resides in devising key-locked unions for panels in adjoining as well as spaced apart facing relationships in hollow walls, or unions of panels in one row with associated structural members such as studs, spars, or joists, by providing the panels both at their parting lines and at modular intervals apart therefrom with segmental tenoned socket-bearing stringers, and interlocking each number of the sockets by linear mortised keys, the sockets borne on each two stringers at a panel parting line being jointly equivalent to a socket borne on the stringers apart from the parting lines, whereby the panel parting lines in the sides of a hollow wall can occur at either coincidental or non-coincidental locations, or in random relationship of both occurrences, and whereby the panel parting lines in a single row of panels can occur at anyone of structural members associated with the panels.

An object of far-reaching importance is a wall structure of panels interlocked by linear mortised keys or splines, the panels being formed with webbed means or stringers and segmental tenoned sockets thereon for engagement of the keys, certain of the panels being interlocked at right angles to others to form L- and T-intersections between the walls, the stringers on such panels being inclined thereto and reaching jointly to one key at each intersection, and forming jointly a stress member thereat.

An object of particular utility is a panel structure for dwellings, wings, fluid containers, etc., in which a sealing strip is lodged and compressed by and between stringers on each two adjoining panels because of their mortise-and-tenon interfit with a linear key.

The foregoing objects and the advantages accruing therefrom are achieved by the particular mortised key union of stringers as applied to thin panels for the purpose of not only cojoining them with each other, or with associated structural members, in several useful relationships, but also for providing stress members for the panels by virtue of the union of the stringers, or of the stringers and structural members, being relatively immobile angularly and transversely; products embodying this panel construction include, as their primary components, a number, i.e., one or more of panels, and one or more of structural members associated with the panel or panels and distanced therefrom; two or more of the panels meet with each other edge-to-edge at parting lines to form a continuous surface which may, for instance, be one side of a building wall or of an airfold shell; the structural member or members may be in the form of either another panel or panels in a spaced apart facing relationship to the first panel or panels, or they may be represented by individual stress members, such as studs, spars, or joists, disposed at and along the panel edges and at intervals therebetween.

Inserted between these primary components of the structure are linear keys of a grooved, fluted or mortised profile, as the interlocking means; the keys contemplated for this function are of an improved type over those heretofore employed for locking parts together, by being devised for a most effective engagement as well as for maximum strength in transverse tension and in torsion, are characterized by a constant profile which is made up of peripheral lands as portions of a basic geometrical figure, such as a circle, hexagon, octagon, or square; between these lands run lengthwise grooves, flutes or mortises, and give rise to tenons under the lands. This improved type of keys is disclosed in my application for Linear Interlocking Key or Spline, Serial No. 23,994 filed April 22, 1960; some of the distinguishing features of this type reside in that it has mortises and tenons with preferably flat or concave flanks, the flanks being substantially normal to the key periphery and being directed so that a dovetail shape results for either the tenons, or both the tenons and the mortises; the mortises are formed preferably with bottoms as portions of a geometrical figure of a size only fractionally smaller than the key peripheral figure so that the mortises are relatively shallow, their optimum depth being about one half of their width; and the keys are preferably hollow and with walls of constant thickness, at least at the mortise bottoms, for elimination of stress concentration.

Other useful results deriving from this configuration of the key profile include distribution of the material close to the key periphery and consequent large section modulus and radius of gyration with the least weight; engagement between the keys and the parts of a structure at tenons low in height so that they are subject to shear rather than to bending, thereby being able to stand higher stresses; and the slidable engagement between the keys and the parts taking place at the mortise and tenon flanks only, i.e., at radial faces rather than at oblique or peripheral ones, whereby both angular and radial play or lash between the engaged parts can be minimized by precision forming of such flanks only.

For effecting a union of the panels, or panels and individual stress members with each other, by means of the grooved or mortised keys, each panel, or panel and stress member, is provided with at least one longitudinal segmental socket; the profile of this socket spans angularly a segment of the key profile, and includes a basic cove face which corresponds to the key periphery, and on it extend to a lengthwise marginal tenon at and along the socket edges, and another tenon or tenons may extend intermediate the margial ones; the tenons have radially converging directions so that the distance between their summits is narrower than that between their bases on the cove face; by fitting with their tenons into the grooves or mortises in the key, a number of such sockets pertaining to two or more panels, or to a panel and an associated stress member, obtains an engagement complementally with each other on the key; since the engagement takes place only at the flanks of the key and socket tenons, even though it is a lengthwise slidable one, it is practicable with ordinary extrusion and rolling processes to maintain such close clearances as to secure a relatively immobile union of the parts with the key in the transverse and angular directions whereby the key will cause the parts to coact as virtually a single member.

One of the distinguishing features in all embodiments of my new structure resides in that the primary components, i.e., the thin panels, or panels and associated stress members, are spaced apart from each other frontally for the purpose of providing a hollow wall, or for effecting a union with the stress member or members over a large panel area without allowing the member or members to bear directly against the panels; this spaced relationship between the primary components of the structure is made possible by employing web means on the panels, preferably in the form of stringers, for not only functioning in their usual manner as auxiliary stress members, but additionally for carrying the segmental tenoned sockets for the panels, and in certain cases also for the stress members, although these can advantageously be formed with the sockets in their body. The stringers are integral parts of the panels, i.e., they are either formed in one piece with them, or are formed separately and are attached permanently to the panels, such as by flanges which serve the useful purpose of distributing stresses over a large panel area; panels so constructed become panel units even though they are hereinfurther referred to only as "panels."

For cojoining panels in a spaced apart facing relation, or for cojoining panels with distanced stress members, the panels are provided with the socket-bearing stringers at and along their lateral edges, and may be provided with the socket-bearing stringers also at modular intervals intermediate their edges; for cojoining panels in a row edge-to-edge, the edge stringers are characterized each by a profile which amounts substantially to one lateral half of one intermediate stringer and of the segmental socket thereon; each two such edge stringers and their sockets on two adjoining panels represent jointly a full equivalent of one intermediate stringer and socket.

This equivalency between the two stringer types, i.e., two edge stringers, or at least the sockets thereof, jointly amounting to one intermediate type stringer and socket, represents a principle of far-reaching consequences in hollow wall construction, or in construction of walls with panels dependent upon stress members for support; inasmuch as the two stringer types are equivalents panels of different modular widths bearing them can by associating with each other not only edge-to-edge but also in spaced apart facing relationships regardless where their parting lines may occur, thereby making random occurrence of both coincident and non-coincident parting lines in hollow walls practicable, and making it possible for panel parting lines to occur at anyone of stress members disposed at modular intervals along the panels.

The stringers as parts of the panels are further useful in that intersections of all types between hollow walls, or between single-file walls, are constructed by means of them; to this end, both the edge and the intermediate type stringers on the respective panels meeting at parting lines at an intersection and on panels continuous through it, are set at an inclination to those of their panels which form a right angle or meet at such an angle, so that the stringers from all of the panels forming the intersection carry their sockets coaxially with each other in the center of the intersection, and are interlocked by one key for uniting the panels as well as for creating virtually a single stress member out of the stringers.

The foregoing constructions of hollow walls or bodies from panels are made even more useful by embodying in them certain parts or members for specific purposes, such as terminal members transverse to two spaced apart facing panels for providing a closure, or a door or window frame in a wall, or the leading edge in an airfoil body; such a member is formed with a segmental tenoned socket, and with it engages a key jointly with the panels; another innovation resides in lodging a sealing strip between two juxtaposed edge stringers on panels meeting edge-to-edge, and subjecting it to compression by the relatively immobile engagement of the stringers with a key.

The above outlined principles of assembling structures of thin panels, or panels and stress members, by means of stringers of two equivalent types on the panels, and by means of grooved or mortised keys, are applicable to a limitless number of embodiments; in the following text is described a number of representative examples of such embodiments with reference to the drawings which form an integral part of this specification.

In the drawings:

FIG. 1 is an end view of the extremities of two structural members, such as two panels or stringers, bearing segmental tenoned sockets in a slidable mortise-end-tenon interfit with a linear key.

FIG. 2 is an end view of two panels meeting with each other edge-to-edge and cojoined by means of juxtaposed stringers which bear segmental tenoned sockets in a slidable dovetailed engagement with a mortised key.

FIG. 3 is a profile view of a union of two adjoining panels and a third panel in a spaced facing relationship thereto, with juxtaposed edge stringers on the former panels and an intermediate stringer on the latter panel jointly engaging a mortised key by means of segmental tenoned sockets.

FIG. 4 is a perspective view, partly sectionalized, of a building wall consisting of two spaced rows of panel units interlocked edge-to-edge as well as in their spaced relationship by means of stringers of two equivalent types, and by means of mortised keys dovetailed into the stringers.

FIG. 5 is a profile view of a portion of a structure in which two rows of panel units are held in unity by means of edge type and intermediate type stringers and mortised keys, the keys having a basic octagonal shape and dovetail tenons.

FIGS. 6, 7 and 8 show typical unions of edge type and intermediate type stringers on adjoining and on spaced apart panels, the mortised keys and the corresponding stringer sockets having different basic shapes, i.e., oval, square and polygonal, respectively.

FIG. 9 is a profile view of a union of three panels and stringers thereon in engagement with a mortised key, both the stringers and the key being of rolled origin.

FIG. 10 shows the components of a union of three panels in a hollow wall or floor, the mortised key which effects the union by engaging stringers on the panels being offset from the central location to strengthen the side which in a floor is subject to compression.

FIG. 11 is a floor or wall structure in which a single-file row of panels is cojoined with associated structural members, such as joists or studs, by means of stringers reaching to the members and interlocked with them by mortised keys.

FIG. 12 is a union of panels in edge-to-edge alinement with each other and joined with a distanced stress member, such as a stud or joist, by means of juxtaposed stringers and two mortised keys.

FIGS. 13 to 16 represent plan views of various wall structures with L- and T-intersections therein, the panel rows in each embodiment being secured into unity by linear keys dovetailed into stringers of two basic and equivalent types, and having a different profile in each embodiment.

FIG. 17 is a perspective view of an airplane wing and of an aileron or flap connected to it, the facing panels in each case being locked to each other by stringers and mortised keys, which stringers and keys function as unitary spars, and a member keyed to two of the stringers laterally forms a terminal leading portion of the wing.

FIG. 18 is a plan view of a cabinet, such as in a refrigerator, in which panel units are interlocked to form hollow walls by having stringers thereon engage linear mortised keys at either contiguous or isolated segments.

FIG. 19 is an end view of a column or container in which an exterior shell and interior stays are held in unity by linear keys dovetailed into stringers on shell panels and into the stays directly.

FIG. 20 is a profile view of a keyed union of three panels, two of them meeting with each other edge-to-edge and facing the third one as in the union of FIG. 3, except in that the key engagement with the panel stringers has a common grooved profile in distinction to the improved dovetail shape in the latter figure.

FIG. 21 is a union of stringers on adjoining as well as facing panels, the stringers having segmental sockets with multiple teeth on them, and are in engagement with a serrated linear key.

FIG. 22 is a perspective view of a building wall analogous to that of FIG. 4, the keys in the subject figure being of a grooved or fluted type improved in certain respects over the key type of FIG. 20.

FIG. 23 is a plan view of a wall structure consisting of straight runs and L- and T-intersections between them, the panel units forming the structure being held together by integral stringers in engagement with linear grooved keys.

FIG. 24 is another wall structure assembled of panel units and interlocked by linear keys, and differing from the preceding structure in that the panel units in the inner rows are parted remotely from corners, and the stringers are of a box section.

FIG. 25 is a wall or a floor in which a single row of panels is backed up by individual stress members such as studs or joists, distanced from the panels and locked into unity with them by means of stringers and linear keys.

FIG. 26 is an end view of a structure such as a floor or a roof, embodying spaced rows of panels and interjacent beams, the panels being locked to each other edge-to-edge as well as frontally to the beams by stringers and linear keys, and being reinforced by transverse members or ribs intervening between the stringers.

FIG. 27 is another floor or roof structure, the beams in this case forming a diagonal truss between the panel rows.

The structural union of FIG. 1 possesses certain basic features that distinguish all of the keyed unions in the various embodiments of my new structure hereinfurther described; a linear key 9 locks together structural members 1 and 2, which members may be the extremities of any two associated components in a structure, such as two panels, stringers, stress members, or any one of such components in association with a different one; the members are provided with respective segmental sockets 3 and 4 which extend with a constant profile along one edge or end of each member; this profile is defined by a basic cove face 5, circular in this case, on which run marginal tenons 7 and 8, and intermediate them a number of tenons 6; the marginal tenons 7 and 8 are only half as wide as the intermediate ones, and all of them are characterized by a summit as a portion of a circle, and two flanks which, in the preferred form, are either parallel, or are divergent to impart a dovetail shape to the tenons, as shown. Into engagement with both of the sockets 3 and 4 and the tenons thereon is slid endwise key 9.

The profile of the interlocking key or spline contemplated for use in my new structure may vary widely, and includes on one hand the hitherto common profile as shown in FIG. 20, or the shallow grooved profile as shown in FIGS. 21-27 as an improvement over the common type, and on the other hand includes the type shown in FIGS. 1-19 as the preferred type far improved over the common one. The latter type, as represented in FIG. 1, is characterized by a periphery which conforms to a basic geometrical figure, the same as the cove face 5 in the sockets 3 and 4, and in it a plurality of angularly equidistant grooves or mortises corresponding to the shape of the socket tenons 6 so that a number of tenons are formed on the key under peripheral lands as portions of the aforementioned geometrical figure. The flanks of the key mortises and tenons, as well as the matching flanks on the socket tenons 6, are preferably substantially normal to the key periphery, and are flat, and it is at these flanks only that contact and engagement between the key 9 and the sockets 3 and 4 take place, to the exclusion of all other surfaces, viz., the key peripheral lands and the bottoms of the key mortises; clearances, even minute ones, between the key and the sockets are provided except at the mortise and tenon flanks, and the flanks can be formed easily with such accuracy as to obtain a relatively immobile engagement between the key and sockets, except for a lengthwise slidable motion, as to cause the sockets and their primary components of the structure to become virtually a single member.

The key 9 is further distinguished in that the bottoms of its mortises between the substantially radial or normal flanks are portions of a central geometrical figure smaller by a minor fraction of the size of the key peripheral figure; this relationship results in mortises of a relatively shallow depth 96 as well as in key and socket tenons of a low height; as shown in all of the figures with the improved type of the key, the depth of the key mortises is not greater than their width, and as shown in FIG. 1 the depth 96 is preferably about one half of the mortise width 6a; this proportion has as one of its results the marginal tenons 7 and 8 in the sockets about as wide as they are tall, so that these tenons as well as the intermediate ones in the sockets and the key tenons as well will be stressed in shear rather than in bending. Another result of such shallow key mortises is that the key material is disposed remotely from its center and close to the sockets which subject it to stresses; another result is that such shallow mortises and peripheral disposition of the key material afford a large section modulus and radius of gyration, in view of which the key can be made tubular; a central opening in it is of a shape—circular in this case—such as to form walls at the mortise bottoms of a substantially uniform thickness 97, thereby eliminating stress concentration and local weaknesses in the key profile.

One of the fundamental relationships in my new panel structure is that of two adjoining panels in a row meeting with each other, and it is most important that such panels meet edge-to-edge in perfect alinement and with the seam or parting line between them as tightly closed as possible, and in most structures also sealed against entry of air and water; the manner of applying the above disclosed components to such panels is shown in FIG. 2; panels 10 and 11 are provided at and along their meeting edges with juxtaposed stringers 12 and 13, respectively, both alike, each having an attaching flange 14 and rising from it an arcuate wall 15 on the inner side of which is formed a cove face 16, marginal half-tenons 17 and 18, and intermediate full tenons 19, as elements of a segmental socket. The sockets of both of the stringers 12 and 13 complement each other in coaxial alinement by combining their respective half-tenons 17 and 18, and are both in engagement with a key 20 which embodies all the novel and useful features and proportions of the key of FIG. 1.

In order to render the seam between the panels 10 and 11 impervious to elements, a weather strip 21 is lodged inbetween the stringers 12 and 13 in opposite grooves therein in proximity of the panel edges; the strip 21 functions by being compressed by and between the stringers due to their relatively immobile engagement with the key 20.

Another fundamental relationship of panels in my new wall structure is shown in FIG. 3; two panels 22–23 in a row meet with each other edge-to-edge, and are united with a spaced apart facing panel in another row; the union is effected by means of juxtaposed edge stringers 25–26 on the meeting panels, by a stringer 27 on the facing panel, and by a mortised key 28; each of the stringers 25–26 has an attaching flange 29, and a segmental socket between a wall 30 and the panel parting line plane; the socket is defined by a cove face and marginal tenons 31 and 32 thereon, of which tenon 31 at the parting line plane is one half as wide as tenon 32. Stringer 27 on the facing panel 24 is affixed to it apart from its edges by flanges 33, and represents a type hereinfurther referred to as "intermediate"; in profile it amounts to the two stringers 25–26 in juxtaposition in that it carries a segmental tenon socket between lateral walls 34 equal to the combined sockets of the former stringers. Key 28 has six lengthwise mortises therein of a depth about one half their width, and with bottoms as portions of a geometrical figure, flat engaging flanks directed into dovetail shape of the key tenons, and tubular walls of uniform thickness under the mortise bottoms, similarly as the key of FIGS. 1 and 2; because of its effective engagement of the stringers by the dovetail tenons, the key can engage them at non-contiguous segments, as shown.

A sealing strip 35 is confined between the stringers 25–26 in a channel over the panel edges, and is compressed by the engagement of the stringers with the key.

The fact that the juxtaposed edge stringers 25–26 jointly form an equivalent of the intermediate stringer 27 in the matter of their sockets, is one of the fundamental principles underlying my new structure; it allows panels in facing rows in a wall or body to be placed in any random relationship so that their parting lines in both rows may either coincide, in which case four edge type stringers at such lines are interlocked by one key; or, the parting lines may not coincide, in which case two edge type stringers are key-locked in opposition to one intermediate stringer; or, the panel parting lines in both rows may occur in both coincident and non-coincident relationships with the two stringer types in indiscriminate opposition of one type with the other, and with the same types in opposition to each other. This principle makes it possible to assemble structures of any shape and extent from panels of different widths, and from flat, angular or curved ones; an example of one such structure for building walls is shown in FIG. 4.

The primary components of this structure are panel units disposed in spaced apart facing rows 36–37–38 and 39–40–41, each panel unit consisting of a panel and edge type stringers 42 and 43, and intermediate stringers 44 and 45; the latter stringers include attaching flanges 46 and 47, walls 48 and 49, a cross-web 50 supported by and between the walls and forming a segmental socket with a circular cove face and marginal half-tenons 51 on it 180 degrees apart, and full tenons 52 intermediate them.

The edge type stringers have a profile composite of an attaching flange 53 as a projection of a base 54, walls 55 and 56, and a shoulder 57 on the latter wall apart from the panel parting line; both walls support an inwardly arched cross-web 58 which provides a cove face with marginal half-tenons 59 and 60, and at least one intermediate full tenon 61; two such quadrantal sockets on juxtaposed edge stringers, such as 42–62, combine so that they jointly provide one full tenon astride each panel parting line, and constitute an equivalent of the 180-degree socket on the intermediate stringers.

In the assembled wall, the edge and intermediate type stringers on the panel units become alined coaxially in various combinations, such as two intermediate stringers in opposition with one another, or four edge type stringers 42–62–63–64 in paired opposition to one another; the opposed stringers confront each other at their shoulders and combine their half-tenons thereat, and thus form a tenoned opening into which is slid a linear mortised key 65, the mortises 66 of which engage the socket tenons and half-tenons at their flanks and lock the stringers and their panel units together relatively immovably in the transverse and angular directions.

The erection of the structure of FIG. 4 is facilitated in that the panel units need not be lifted except to place them on a sill 67, resting on and secured to a foundation wall 68 in the usual manner; only the relatively light keys 65 are handled in telescoping them into place; the wall may be secured in place by any means, such as rods 69 threaded into the sill through the hollow keys. The seams between the panel units are sealed by weather strips 70 which are contained and compressed by the stringers by virtue of their engagement with the keys.

The basic circular shape of the mortised keys employed in the preceding panel unions is but one of many other shapes that may be employed; in the structure of FIG. 5, for instance, spaced apart facing panel units 71–72 and 73–74 are held in the assembly by keys 75 with an octagonal periphery and shallow mortises in the sides of the octagon; a substantially uniform thickness of the mortise walls in the tubular key section is obtained by either an octagonal opening through the key, or by a circular one, as shown; the edge type stringers 76–77, with a seal 78 therein over the panel edges, and the intermediate stringers 79 are otherwise analogous to those of FIG. 4.

Further variants of the key profile, which conform to the disclosed features resulting in a maximal section modulus and strength of the tenons, are exemplified in FIGS. 6 to 8; key 80 in the former figure is oval with six dovetail mortises in it; key 81 and key 82 in the two latter figures are both square with the distinction in that in the key 81 the mortises occupy both the sides and the corners of the rectangle, while in the key 82 four mortises only run in the corners of the rectangle. Inasmuch as the juxtaposed edge type stringers in these unions provide a full equivalent of the tenoned socket of the intermediate stringer in opposition to them, as has been disclosed in relation to FIG. 3, this figure as well as FIGS. 6 to 8 represent the essential components of wall structures, such as the one of FIG. 4, and the stringer types shown in them can be used indiscriminately in opposition of one type with the same type, or with the other type, and on panel units of the same width, or of different widths, in compatible association because of the principle of equivalency of the two stringer types.

The embodiment of FIG. 9 possesses utility additional to that of the preceding embodiments; stritngers 83–84 and 85 on adjoining and facing panels 86–87 and 88, respectively, are fabricated of sheet material, as is key 89, the walls of which are of uniform thickness both at the mortise bottoms and in the tenons; the juxtaposed stringers 83–84 are attached to their panels by flanges 92 at the panel parting line, and over these flanges form a recess in which is confined a sealing strip 93; the stringers confront each other at inner walls 90–91, and on their outer walls carry shoulders 94 with which they abut shoulders 95 on the stringer 85; such abutment of the opposite stringers at shoulders, and of the juxtaposed ones at their inner walls, when the stringers are formed of resilient material, serves to increase the immobility and stability of the interlocked parts over those which rely only upon their close fit with the key for relative immobility.

The same sheet metal construction characterizes the parts in the union of panels 99–100 and 98 of FIG. 10 by means of respective stringers 102–103 and 101, and key 104; the structure is a floor or a deck in which compressive forces occur at the top side, and in order to reinforce the panels thereat the keys are offset upwards from the central location; although the juxtaposed edge stringers as disclosed in the preceding embodiments make it possible for adjoining panels to abut edge-to-edge and be held flush with each other, in FIG. 10 the panels 99–100 are flanged inwardly and abut at their flanges 105; a grooved sealing strip 106 straddles the flanges for closing off the parting line between the panels.

The embodiment of FIG. 11 represents a single-file wall or a floor in which the associated structural member to a row of panels 107–108 is a stress member such as a joist or stud 109 which takes the place of an intermediate stringer in opposition to juxtaposed edge stringers 110–111 on the panels; each of the stringers as well as the joist is formed with two marginal half-tenons as parts of its segmental socket for engagement with a key 112; the shape of this key is basically triangular with a mortise in each apex in which the socket half-tenons confront and abut each other while engaging dovetail tenons of the key.

In certain structures, such as shown in FIG. 12, more than one key may be employed to interlock the panels with one another as well as with an associated stress member; adjoining panels 114–115 are key-locked into unity with a member 116 and thereby with each other by means of juxtaposed stringers 117–118 on them in engagement with two keys 120 and 120a; each key interfits with one of the stringers and with the member for securing the panels to the member frontally and for causing them to abut at their parting line, thereby also compressing a sealing strip 119 between the stringers.

The following figures, except FIGS. 20 and 21, all represent structures for various purposes as well as intersection constructions by means of interlocked stringers of the types hereinabove disclosed and other useful ones; in each case, the stringers perform the novel functions as carriers of key-engaging sockets, and as principal stress members in union with one another.

In the structure of FIG. 13 panels in spaced apart facing rows 121–122 and 123–124 form an L-intersection of hollow walls; in the walls the panels are united by opposed stringers 125 and 126 in engagement with keys 131 in the manner as shown in FIG. 3; at the intersection, the panels are provided with edge type stringers 127–128 and 129–130, respectively, the stringers being laterally contiguous with each other at a diagonal plane which connects the parting lines in the two panel rows; the right-angle relationship between the panels 121–122, and 123–124, is thus effected by inclining the stringers with respect to their panels and causing them to carry their segmental sockets next to a diagonal plane through the panel parting lines; this principle of intersection construction will be in evidence in all the intersections hereinfurther disclosed.

In the structure of FIG. 14 hollow walls and an L-interesction therebetween are formed by panel rows 133–134 and 135, and 136–137–138, and by two species of edge type stringers, 139–140 and 143–144 representing a normal species on facing panels in the walls as well as on the outer panels at the intersection, and 141–142 an inclined species on the inner panels at the intersection; the former stringers are in engagement each with one side of a square key such as 132, while the inclined latter stringers are both in joint engagement of one key side; a molding 145 is dovetailed onto the key side between the separated stringers 143 and 144 to provide continuity between the outer panels 134–135.

Several rows of panel units 146–158 constitute the primary components of the wall structure of FIG. 15, and are cojoined in coplanar relationship by edge type stringers such as 159–160, in right-angle relationship by edge type stringers such as 161–162, and in spaced apart facing relationship by these edge type stringers of both species as well as by intermediate stringers such as 163; thus two stringer types and two species of one of them make it feasible to assemble not only the hollow walls but also all necessary intersections between them, i.e., L- as well as T-intersections. All of the edge type stringers, the normal ones 159–160 as well as the inclined ones 161–162, carry on them a segmental tenoned socket of one octant or 22½ degrees in span, and the intermediate stringers carry a socket of one quadrant in span; at a T-intersection, four edge type stringers 161–162–170–171 jointly encompass one half of a mortised key 165a while the intermediate stringer 163 on a panel continuous through the intersection occupies a non-continuous sector in opposition thereto; the four edge type stringers could, together with four other such stringers around the other half of the key, form a cross-intersection of four walls.

A tubular post 164 fills in the quadrant between the outer panel units 149 and 150 by latching onto the same key 165 with their edge type stringers 168 and 169. All seams between the meeting panel units are sealed by weather strips 172 which are compressed by the engagement of the stringers and of the post with the keys.

The wall structure of FIG. 16 is distinguished from the preceding one in that it employs stringers of box sections and panel parting lines located away from wall intersections so that the panel units are continuous around all inner corners; rabbet joints are used to attach the stringers to right-angle panels whereby the stringers provide with their base web corner fillets. Panel units 173–180 form to straight runs as well as L- and T-intersections in hollow walls by means of two types of stringers and two species of each one; intermediate type stringers include a normal species 182, and an inclined species 183, the former with a 180-degree tenoned socket, and the latter with a 90-degree socket and an arcuate web 186 between right-angle flanges 184–185 as a corner fillet; edge type stringers include a normal species 187–188 with a 90-degree socket, and a corner species 190–191; the latter stringers have each a flange 194 into which is rabbetted one of the right-angle panels 173–174, and from which stem walls 192 and 193, of which the former one is a continuation of the panel to a parting line located at the intersection, and both walls carry a 135-degree socket. When interlocked by keys 181 in complemental association of their sockets, the different stringer types and species thereof constitute primary stress members of a box section, disposed at modular intervals in the walls as well as at the intersections thereof.

The same principles of construction from individually and accessibly fabricated panel units as employed in the preceding structures with parallel walls are made use of in the wing and its aileron or flap of FIG. 17; panel units 195 and 196 jointly form an airfoil shell, and are provided with respective edge type stringers 197 and 198 at their fore edge, and with intermediate stringers 199 and 200 apart therefrom; the two stringer types on both panel units are in opposite alinement with each other and in coaxial alinement of their sockets, and mortised keys 201 are dovetailed slidably into engagement with the socket tenons and combined half-tenons. Complementing the panel units and forming the leading edge portion of the airfoil is a terminal member 202 which abuts the edge stringers 197–198, and is interlocked with them by means of a tenoned socket in engagement with one half of a key 201a. In this structure the opposed stringers function jointly as unitary spars subject to bending forces.

The construction of the flap or aileron of FIG. 17 is analogous to that of the wing, and consists of panel units 203–204 held in unity by opposed stringers 205–206 and by a key 207, which interlocks them relatively immovably in the transverse and angular directions.

Another hollow wall structure assembled from components and in the manner of the preceding ones is that of FIG. 18; in it panel units 208–209–210 and 211–212–213 form a cabinet with space in its walls for insulation; the panel units carry intermediate stringers 214 with octantal tenoned sockets thereon, and edge type stringers 215 the combined sockets of which on the four panel units at each wall intersection encompass about four fifths of a key 216; the remaining segment allows a molding 217 to be dovetailed onto the same key.

A type of structure wherein the associated members to juxtaposed edge stringers 218–219 on panel units 220–223 are individual stress members, in this case stays 224, is shown in FIG. 19; the stays are formed with marginal segmental tenoned sockets 225 and 226, of which one is dovetailed onto the shallow-splined key 227 together with the panel unit stringers, and the other one onto a like central key 228 together with the other stays therearound.

The preceding disclosed structures all employ an improved type of a mortised or grooved interlocking key; this type augments the utility of the structures because it results in a better engagement of the components with it, in stronger and lighter unions, and in greater relative immobility of the components and consequent closer coaction as unitary stress members; other types of keys of the same genus may be employed, and the following structures document this by showing a common species and another improved one of the interlocking key.

In FIG. 20, the union of meeting panels 229–230 with each other and with a facing spaced apart panel 231 is effected by a key 232 which represents the hitherto only available interlocking key for three or more components; in contrast to the improved key 28 in the same basic union of panels of FIG. 3, key 232 has a profile consisting of bulbous lobes and deep grooves, and its engagement with juxtaposed edge stringers 233–234, and with intermediate stringer 235, on the respective panels, takes place at oblique flanks on the lobes which become tangential to the key periphery; the opposite half-tenons 236 of the intermediate stringer obtain adequate engagement with the key so that a full tenon in the stringer socket at 237 can be dispensed with without affecting the principle of equivalency between that stringer and the juxtaposed edge stringers in opposition to it; because of this principle, the stringers of the union of FIG. 20 can be used in random association in three different combinations with one another to assemble wall structures of any extent with panels of various modular widths. A sealing strip 238 at the panel parting line is compressed by the engagement of the stringers containing it with the key.

Another species of the grooved key profile is shown in FIG. 21, key 239 having multiple grooves or serrations in its periphery, and stringers 240–241 and 242 on panels in meeting and spaced apart facing relationships having conforming serrated segmental sockets; in this union, marginal teeth 243 and 244 on the stringers do not engage the key in the same groove, similarly as already demonstrated in FIG. 3.

A species of key improved over the rounded lobe type of FIG. 20 is shown in the structure of FIG. 22; this structure is otherwise analogous to that of FIG. 4, consisting of panel unit rows 245–246–247 and 248–249–250, on which extend at modular intervals intermediate stringers 251, and edge type stringers 252–253 at parting lines in opposition to like stringers 252a–253a; one of the intermediate stringers 251 can take the place of either pair of the edge stringers at non-coincident parting lines; keys 254 have four circular periphery lands and four grooves or mortises 255 therebetween of a semi-circular shape the center of which lies somewhat below the periphery so that the slightly concave engaging flanks are substantially normal to the periphery, and the depth of the grooves or mortises is one half that of their width; these are certain of the features that distinguish the improved key profile as disclosed in FIGS. 1–19; because of the particular proportions of the key grooves or mortises, the half-tenons 256 on the stringer sockets are about as tall as they are wide for subjecting them to shear rather than to bending, as in the case of the former key; similarly as in FIG. 20, full teeth or tenons may be omitted from the cove face 257 of the sockets in the intermediate stringers 251.

A structure embodying shallow-grooved or mortised keys of the improved species is shown in FIG. 23, and is analogous to the structure of FIG. 15; in this case, panel units 258–259, 260 to 264, and 265 to 269 form the walls and the intersections therebetween with two stringer types, the intermediate type 270, the edge type 271, and a species 272 of the latter type inclined on their panels at the intersections. Keys 272 have eight grooves or mortises in them of a semi-circular shape and substantially half as deep as wide for reduction of bending stresses in their tenons, particularly in the socket half-tenons 274, and for a large central opening whereby the key material is disposed at the key periphery for a large section modulus with the least weight and proximate to the sockets.

At the L-intersection, panel unit 268 is of a tubular section and constitutes a post composite of several essential parts combined into one, viz., the outer panel, lateral webs 275 in juxtaposition to normal panel edge stringers 271, and a quadrantal tenoned socket 276 in engagement with key 273; this post construction is analogous to that of the post 64 in FIG. 15.

Two stringer types and inclined species thereof establish the relationships between the panels in the wall structure of FIG. 24; the stringers are of a box section analogous to those in FIG. 16, and the panels are rabbetted into the stringers and form panel units with them continuous around the wall inner corners; square keys 277 are grooved in their apices. Spaced apart facing panel unit rows 278 to 282, 283–284, and 285 to 287 form the hollow walls and intersections therebetween by means of intermediate normal stringers 288, intermediate inclined stringers 289, edge type normal stringers 290, and edge type inclined stringers 291–292; the intermediate stringers carry a segmental tenoned socket of a V-shape with marginal half-tenons on it, and the edge type stringers jointly duplicate this socket as well as combine their half-tenons at the panel parting lines for engagement with a key groove thereat; the inclined edge stringers 291–292 are attached at a distance from the corner between the panels 281–282 and engage opposite sides of the key in a non-contiguous relationship to each other, except at the panel parting line where they confront each other and retain a sealing strip 293 under compression by virtue of their engagement with the key.

The structure of FIG. 24 also illustrates an embodiment of a terminal member in the form of a door stile or window frame 294; facing panel units 278 and 283 have edge type stringers 290a on them in opposition to each other, and the member 294 abuts their sides, and together with them engages key 277a; sealing strips 295 are compressed by this engagement between the member and the stringers. This construction is analogous to that of the attachment of the leading portion 202 to the wing of FIG. 17.

A structure in which individual stress members instead of panel units with stringers on them constitute the components associated with a row of panels, is shown in FIG. 25; it represents an application of a key-locked union similar to that of FIG. 11; keys 296 in this case are of a basic round shape with three flutes in them, which is a minimum number required to interlock two juxtaposed stringers 297-298 on meeting panels 299-300 with an opposed stress member, such as a stud or joist 301. Intermediate stringer 302 as an equivalent of the two juxtaposed ones is in engagement with its socket of two of the key tenons, and the member 301 with the third one. Sealing strip 303 is included and compressed in registering grooves 304 in the keyed together juxtaposed stringers.

The use of individual stress members in association with stringer-bearing panels is carried out to its full significance in the following two structures in which stress members are disposed interjacent two panel rows to form, in conjunction with stringers thereon and with the interlocking keys, walls, floor or decks of increased width and strength. The structure of FIG. 26 includes panel rows 305-306 and 307-308 and beams 309; the panels are provided with edge type stringers 310 in juxtaposition to each other at panel parting lines, and with intermediate stringers 311 apart therefrom, the two stringers types being equivalents of each other in the matter of their segmental tenoned sockets, as in all of the foregoing structures; the beams are constructed of caps 312 and truss members intervening between flanges on the caps; the caps are formed with segmental tenoned sockets identical with those in the stringers 311; the beams are interlocked by keys 313 with those of the intermediate or edge type stringers with which their caps fall into random opposition at assembly; due to the equivalency of the two stringer types, the panels may be of any width which is a multiple of a module, and their parting lines may occur at anyone of the beams. In addition to interlocking the panel stringers with the beams relatively immovably in the angular and transverse directions, the keys cause a compression of sealing strips 314 between the juxtaposed stringers at the panel parting lines.

In order to render the stringers on the panels relatively immobile to each other and thereby make the use of thin panels practicable, the panels are reinforced by stiffeners or ribs 315 which extend on them transversely to the stringers and abut the stringer sides; these stiffeners transfer loading forces from the panels into the stringers and through them and the keys into the beams.

In a manner analogous to key-locking either an intermediate type stringer as an auxiliary stress member, or a beam as a principal stress member to anyone of the two stringer types on a panel, two such principal stress members or beams may be interlocked in opposition to panel stringers in the manner of two juxtaposed edge type stringers; this principle is embodied in the structure of FIG. 27, wherein stress members, such as beams or spars 316, form a diagonal truss interjacent two panel rows 317 and 318-319; each member is composite of two stringer sections joined flange-to-flange so that their segmental tenoned sockets 320 constitute the opposite profile extremities of the member; the panels are provided with juxtaposed edge stringers 321-322, and with intermediate stringers 323, to each of which stringers converge two of the members 316 and are interlocked therewith by a mortised or grooved key 324.

I claim:

1. In a structure, a number of structural members coextensive with one another, a linear lengthwise grooved key extending in a spaced relationship to said members, web means extending on each of said members and therefrom reaching to said key, and segmental toothed sockets borne by said web means coaxially with one another, said sockets being in a slidable and in a transversely and angularly substantially immovable engagement with said key for constraining said members in said coextensive relationship to each other by said spaced key.

2. In a structure, components and their relationships as set forth in claim 1, said key having grooves therein in the form of relatively shallow mortises, said mortises having bottoms as portions of a geometrical figure smaller than the key size by a minor fraction for disposing the key material close to said sockets for maximum strength, and said mortises having flanks substantially normal to the key periphery for engagement of said sockets thereat.

3. In a structure, components and their relationships as set forth in claim 2, said key mortises having a depth equal substantially to one half of their width, and said flanks thereof being directed to form dovetail-shaped tenons between said mortises.

4. In a structure, a number of structural members coextensive with one another, a linear lengthwise grooved key coextensive with said members, at least one of said members being proximate to said key and bearing a segmental tenoned socket in a slidable engagement therewith, at least one of said members being distanced from said key, and a stringer extending on said distanced member and reaching to said key and bearing a segmental tenoned socket in a slidable engagement therewith, said key and socket engagement constraining said members relatively immovably transversely and angularly in said proximate and distanced relationships thereof to said key.

5. In a structure, a number of structural members coextensive with one another, certain of said members adjoining one another, others of said members being spaced apart from one another, linear lengthwise grooved keys extending in a spaced relationship to said members and to one another, auxiliary stress members extending on said structural members and therefrom reaching to said keys, said stress members on each two adjoining of said structural members reaching to the same key, and segmental tenoned sockets borne on said stress members in a slidable engagement with said keys, said key and socket engagement being substantially immobile in the transverse and angular directions for constraining said auxiliary stress members in engagement with each key to coact as a unitary principal stress member in said structure.

6. In a structure, a number of structural members coextensive with one another, certain of said members adjoining one another, others of said members being spaced apart from one another, linear lengthwise grooved keys extending at a distance from said members and from one another, at least one web means extending on each of said members and therefrom reaching to one of said keys, said web means on each two adjoining members reaching to the same key, certain of said web means reaching to said keys at right angles to the members thereof, others of said web means reaching to said keys at an inclination to the members thereof, and segmental tenoned sockets borne on said web means, said sockets being in a slidable and otherwise substantially immovable ingagement with said keys.

7. In a structure, a panel, a structural member coextensive with one face of said panel at a distance therefrom, a segmental tenoned socket borne on said structural member along said panel, a stringer extending on said panel and therefrom reaching toward said structural member, a segmental tenoned socket borne on said stringer coaxially with said member socket, and a linear lengthwise grooved key in a slidable and otherwise relatively immovable engagement with said member and stringer sockets for effecting a rigid union of said panel with said structural member through said stringer.

8. In a structure, components and their relationships as set forth in claim 7, said key having a profile consisting of a plurality of peripheral lands as portions of a geometrical figure and lengthwise grooves therebetween, said grooves having bottoms as portions of a central geometrical figure relatively little smaller than said peripheral figure, and having flanks directed into a dovetail configuration under said lands, said key engagement with said member and stringer sockets taking place at said flanks.

9. In a structure, a panel, a number of structural members coextensive with one face of said panel at a distance therefrom, linear lengthwise grooved keys interjacent said panel and each of said members, at least two segmental tenoned sockets in a cojoint slidable engagement with each of said keys, means on said members bearing each one of said sockets, stringers extending at intervals on said panel and having each a wall reaching to one of said keys and bearing the other one of said sockets, and transverse rib members on said panel intervening between and abutting said wall of each two stringers thereon.

10. In a structure, two panels facing each other at a distance, linear lengthwise grooved keys interjacent said panels at intervals from one another, stringers extending on said panels and reaching to said keys in opposition with one another, segmental tenoned sockets borne on said stringers in opposition in a slidable engagement with each key, said key and socket engagement being substantially immobile in the transverse and angular directions for constraining said panels in said facing relationship thereof through said stringers and causing said stringers in opposition to coact as a unitary stress member between said panels.

11. In a structure, two panels facing each other at a distance, auxiliary stress members extending on said panels and reaching into opposition with each other therefrom, longitudinal segmental tenoned sockets borne on said stress members coaxially with each other, a linear mortised key in a slidable engagement with said sockets, said key and socket engagement taking place at mortise and tenon flanks, said flanks forming dovetail tenons between the mortises at the key periphery for maximal transverse and angular immobility of said stringers and panels and for coaction of said stress members in opposition as a principal stress member between said panels.

12. In a structure, two panels forming spaced apart portions of the structure, a structural member extending between said panels and having a profile extremity along each panel at a distance therefrom, stringers extending on said panels and reaching each to one extremity of said member, said member and each stringer bearing longitudinal segmental tenoned sockets coaxially with each other, and a linear mortised key in a slidable engagement with each two of said sockets, said key and socket engagement constraining said panels and member substantially immovably through said stringers in said respective spaced and distanced relationships thereof and causing a coaction of said stringers with said member as a unitary stress member for said panels.

13. In a structure, two panels meeting with each other at a parting line, a linear key extending along said parting line at a distance from said panels, said key having at least three lengthwise grooves therein, auxiliary stress members extending on said panels at said parting line and reaching to said key, segmental tenoned sockets borne on said stress members in a slidable engagement with said key, said sockets being in a joint engagement with one of said key grooves and being each in engagement with another one of said key grooves, said key and socket engagement causing said stress members to become substantially immobile in the transverse and angular directions whereby they coact as a unitary stress member for said panels.

14. In a structure, two panels meeting with each other at a parting line, stringers extending on said panels in juxtaposition to each other at said parting line, longitudinal segmental tenoned sockets borne on said stringers coaxially with each other at a distance from said panels, a linear lengthwise mortised key in a slidable engagement with said coaxial sockets, said key and socket engagement taking place at flanks substantially normal to the key periphery for maximum relative immobility of said stringers and panels in the angular and transverse directions, and a sealing strip lodged between said stringers at said parting line and compressed thereat by said engagement of said key with said stringers.

15. In a structure, two panels meeting with each other at a parting line, a linear key coextensive with said parting line at a distance from said panels, said key having lengthwise mortises therein and having flanks in said mortises substantially normal to the key periphery, and stringers extending on said panels, each stringer having a wall standing on the panel thereof at a plane through said parting line and another wall in a spaced apart relationship thereto, said stringers reaching to said key with the walls thereof and bearing a cross-web thereat, said cross-web spanning a portion of said key periphery and having tenons thereon fitted into said key mortises and being in a slidable engagement with said key at said flanks thereof, said key and cross-web engagement constraining said stringers in the angular and transverse directions for coaction as a unitary box stress member for said panels and for holding said panels together at said parting line.

16. In a structure, two panels meeting with each other at a parting line, at least one structural member coextensive with said parting line at a distance from said panels, a longitudinal segmental tenoned socket borne on said member along said parting line, stringers extending on said panels in juxtaposition to each other at said parting line and reaching toward said member, longitudinal segmental tenoned sockets borne on said stringers coaxially with each other and with said member socket, and a linear grooved key in a slidable engagement with said coaxial sockets, said key and socket engagement being substantially immobile in the transverse and angular directions for constraining said panels and stringers thereof rigidly with each other and with said member in said respective meeting and distant relationships thereof.

17. In a structure, two panels meeting with each other at a parting line, a structural member coextensive with said parting line at a distance from said panels, a linear key interposed between said panels and said member, said key having at least three lengthwise mortises therein, stringers extending on said panels at said parting line and reaching to said key, segmental tenoned sockets borne on said stringers and on said member in a slidable engagement with said key, said sockets having each two marginal tenons thereon, said stringer sockets being in engagement of one tenon thereof jointly with one key mortise and being in engagement of the other tenon thereof each with another mortise jointly with one of the structural member tenons, said key and socket engagement being substantially immobile in the transverse and angular directions for constraining said panels and member in said respective meeting and distant relationships thereof through said stringers and causing said stringers to coact with said member as a unitary stress member for said panels.

18. In a structure, panels in a row meeting with each other at parting lines, structural members coextensive with said panels at a distance therefrom along said parting lines, structural members coextensive with said panels at a distance therefrom at modular intervals intermediate said parting lines, longitudinal segmental tenoned sockets borne on said members along said panels, stringers extending on said panels in juxtaposition to each other at said parting lines and reaching to said members thereat, stringers extending on said panels intermediate said parting lines and reaching to said members thereat, longitudinal segmental tenoned sockets borne on said stringers in juxtaposition and on said intermediate stringers coaxially with said member sockets, each two of said sockets and said stringers in juxtaposition forming jointly an equivalent of one of said intermediate stringer sockets for random occurrence of said parting lines at anyone of said members, and linear grooved keys in a slidable engagement with said coaxial stringer sockets, said key and socket engagement being substantially immobile in the transverse and angular directions for constraining said panels and members through said stringers in said respective meeting and distant relationships thereof.

19. In a structure, components and their relationships as set forth in claim 18, certain of said panels meeting coplanarly at said parting lines, others of said panels meeting angularly with one another at said parting lines, said stringers in juxtaposition on said angularly meeting panels reaching to said structural members next to a plane directed diagonally through said parting lines toward said members.

20. In a structure, two panels meeting with each other at a parting line, a third panel coextensive with said meeting panels at a distance therefrom, stringers extending on said meeting panels in juxtaposition to each other at said parting line, longitudinal segmental tenoned sockets borne on said stringers coaxially with each other, a stringer extending on said third panel and reaching to said stringers in juxtaposition, a longitudinal segmental tenoned socket borne on said stringer coaxially with said sockets on said stringers in juxtaposition, and a linear grooved key in a slidable engagement with said coaxial sockets, said key and socket engagement being substantially immobile in the transverse and angular directions for constraining said panels in said meeting and distanced relationships thereof through said stringers and coaction of said stringers as a unitary stress member between said panels.

21. In a structure, two panels meeting with each other at a parting line, two other panels meeting with each other at a parting line coextensive with and distanced from said first parting line, stringers extending on said panels in juxtaposition to each other at said parting line therein and reaching into opposition with each other from each two of said panels, longitudinal segmental tenoned sockets borne on said stringers coaxially with each other, and a linear grooved key in a slidable engagement with said coaxial sockets, said key and socket engagement being substantially immobile in the transverse and angular directions for constraining said panels in meeting and for distanced relationships thereof through said stringers and coaction of said stringers as a unitary stress member between said panels.

22. In a structure, components and their relationships as set forth in claim 21, said two panels at each of said parting lines meeting angularly with each other, and said stringers extending thereon reaching to said key at an inclination to said panels in a direction diagonal between each parting line and said key.

23. In a structure, two pairs of panel units forming portions of the structure, said panel units in each pair meeting with each other at a parting line in a spaced apart relationship from the parting line of the other pair, a structural member extending between said panels along said parting lines and at a distance therefrom, stringers extending on said panel units at said parting lines thereof and reaching to said structural member, longitudinal segmental tenoned sockets borne on said stringers from each pair of panel units and on said structural member coaxially with each other, and linear mortised keys in a slidable engagement with said coaxial sockets, said key and socket engagement being substantially immobile in the transverse and angular directions for constraining said panels and member as a rigid structure and causing said stringers to coact with each other and with said member as a unitary stress member between said pairs of panels.

24. In a hollow wall structure, panels in two spaced apart rows meeting with each other at parting lines, said parting lines in each row occurring at random modular intervals coincidentally and non-coincidentally with the parting lines in the other row, linear longitudinally mortised keys interjacent said panel rows at said parting lines, stringers extending on said panels in juxtaposition to each other at said parting lines, stringers extending on said panels intermediate said parting lines, said stringers in juxtaposition and said intermediate stringers reaching from said panels to said keys in opposition to each other, segmental tenoned sockets borne on said stringers in a slidable and otherwise substantially immovable engagement with said keys, said sockets borne on each two stringers in juxtaposition being jointly equivalent to one intermediate stringer socket for use of panels of different modular widths and random occurrence of said panel parting lines in said coincidental and non-coincidental relationships.

25. In a hollow wall structure, panels in two spaced apart rows meeting with each other at parting lines, said parting lines in each row occurring at random modular intervals coincidentally and non-coincidentally with the parting lines in the other row, stringers extending on said panels in juxtaposition to each other at said parting lines, stringers extending on said panels intermediate said parting lines at modular intervals therefrom, said stringers in juxtaposition and said intermediate stringers reaching into opposition with one another, four segmental tenoned sockets borne on said stringers coaxially at said coincidental parting lines, three segmental tenoned sockets borne on said stringers coaxially at said non-coincidental parting lines, two segmental tenoned sockets borne on said stringers apart from said parting lines, and linear mortised keys in a slidable engagement with each of said numbers of sockets, said key and socket engagement being substantially immobile in the transverse and angular directions for constraining said panels in said rows and causing said stringers in opposition and in juxtaposition to coact as unitary stress members between said panel rows.

26. In a structure, components and their relationships as set forth in claim 25, said stringers in juxtaposition and said intermediate stringers on said panels having walls spaced apart from each other and having a cross-web connecting said walls remotely from said panels, said cross-web conforming to a segment of the key periphery and having tenons thereon to form the engaging socket for each stringer, each number of said stringers in engagement with one key coacting as a unitary stress member of a box section between said panel rows.

27. In a structure, panels in spaced apart facing rows forming an L-intersection between hollow walls, two of said panels in one row meeting with each other angularly at a parting line at said intersection, a third angular panel in the facing row being continuous through said intersection, a linear lengthwise mortised key interjacent said panel rows at said intersection, stringers extending on said meeting panels in juxtaposition to each other at said parting line and reaching to said key, a stringer extending on said third panel and reaching to said key, said stringers on said meeting panels and on said third panel having an inclination to the panels thereof in the direction of a diagonal plane through said parting line and key, and segmental tenoned sockets borne on said stringers in a slidable and otherwise substantially immobile engagement with said key.

28. In a structure, panels in spaced apart facing rows forming a T-intersection between hollow walls, a panel in a straight row forming the arms of the T, panels in each of two rows meeting with each other angularly at parting lines at said intersection and formng the underarms and the stem of the T, a linear lengthwise mortised key interjacent said panel rows at said intersection, stringers extending on said angularly meeting panels in juxtaposition to each other at said parting lines and reaching to said key, said stringers having an inclination to the panels thereof in the direction of a diagonal plane through the parting lines therein and said key, a stringer extending on said straight panel and reaching to said key, and segmental tenoned sockets borne on said stringers in a slidable and otherwise substantially immoblie engagement with said key.

29. In a structure, panels in spaced apart facing rows forming a T-intersection between hollow walls, two of said panels in one row meeting with each other coplanarly at a parting line at said intersection, panels in two other rows being angular at said intersection and continuous therethrough and forming the underarms and the stem of the T, a linear lengthwise mortised key interjacent said panel rows at said intersection, stringers extending one on each of said angular panels and reaching to said key, said stringers having an inclination to the panels thereof in the direction of a diagonal plane through the angle formed by said panels and said key, stringers extending on said meeting panels in juxtaposition to each other at said parting line and reaching to said key, and segmental tenoned sockets borne on said stringers in a slidable and otherwise substantially immobile engagement with said key.

30. In a structure, panels in spaced apart facing rows associated with one another in coplanar and angular relationships to form an intersection between hollow walls, certain of said panels being continuous through said intersection, others of said panels meeting with each other at a parting line at said intersection, a linear lengthwise mortised key interjacent said panel rows as said intersection, stringers extending on said panels and reaching to said key, said stringers on said meeting panels extending in juxtaposition to each other at said parting line therein, certain of said stringers reaching to said key at right angles from the panel thereof, others of said stringers reaching to said key at an inclination from the panel thereof, and segmental tenoned sockets borne on said stringers in a slidable and otherwise substantially immobile engagement with said key.

31. In a structure, panels in spaced apart facing rows forming an L-intersection between hollow walls, two inner row panels meeting with each other angularly at a parting line at said intersection, two outer row panels being at right angles to each other and having edges at a distance from each other at the wall corner, a post occupying the corner space, said post having a wall meeting with said panel edges at parting lines and forming a complement of said outer row panels around said corner, a linear lengthwise mortised key interjacent said panel rows at said intersection, stringers extending on said meeting angular panels at an inclination thereto and reaching to said key diagonally across said intersection, stringers extending on said outer row panels at said edges thereof and reaching to said key, said post having webs on said wall thereof in juxtaposition to said outer panel row stringers and reaching to said key, and five segmental tenoned sockets borne one on each of said stringers and one on said post webs in a slidable and otherwise substantially immobile engagement with said key.

32. In a structure, two facing panels in a hollow wall or body having coextensive edges and being distanced from each other thereat, a linear lengthwise grooved key interjacent said panels at said edges thereof, stringers extending on said panels at said edges and reaching to said key in opposition to each other, a terminal member providing a closure for said wall or body at and along said panel edges, said member having a portion extending laterally to said stringers along said key, and three segmental tenoned sockets borne one on each of said stringers and one on said terminal member in a slidable and otherwise substantially immobile engagement with said key.

33. In a hollow wall structure, panels in spaced apart rows meeting with each other at parting lines, structural members interjacent said panel rows along said parting lines and at modular intervals apart therefrom and being distanced from said panels, stringers extending on said panels in juxtaposition to each other at said parting lines and reaching to said structural members thereat, stringers extending on said panels intermediate said parting lines and reaching to said structural members apart therefrom, longitudinal segmental tenoned sockets borne on said structural members and on said stringers coaxially with one another, said sockets on each two of said stringers in juxtaposition forming an equivalent of one of said intermediate stringer sockets for random occurrence of said parting lines in each panel row at anyone of said structural members due to panels of different modular widths, and linear mortised keys in a slidable engagement with said coaxial sockets, said key and socket engagement being substantially immobile in the transverse and angular directions for constraining said panels in said spaced apart and meeting relationships thereof and causing said stringers to coact with said members as unitary stress members between said panel rows.

34. In a hollow wall structure, panels in spaced apart rows meeting with each other at parting lines, structural members interjacent said panel rows, said members being inclined laterally towards each other to form a diagonal truss, the convergent profile extremities of said members being distanced from said panels, stringers extending on said panels in juxtaposition to each other at said parting lines and reaching into opposition with said convergent member extremities thereat, stringers extending on said panels at modular intervals intermediate said parting lines and reaching into opposition with said convergent member extremities thereat, longitudinal segmental tenoned sockets borne on said members and on said stringers coaxially with one another, said sockets on each two of said stringers in juxtaposition forming an equivalent of one of said intermediate stringer sockets for random occurrence of said parting lines in each panel row at anyone of said structural member convergent extremities due to panels of different modular widths, and linear mortised keys in a slidable engagement with said coaxial sockets, said key and socket engagement being substantially immobile in the transverse and angular directions for constraining said panels in said spaced apart and meeting relationships thereof and causing said stringers to coact with said members as unitary stress members between said panels rows.

35. In a building structure, panels in straight and angular coextensive and distanced rows forming hollow walls and intersections therebetween, certain of said panels meeting coplanarly with each other at parting lines, others of said panels meeting angularly with each other at parting lines, said parting lines occurring in both coincident and non-coincident locations in rows forming said walls and intersections, linear lengthwise grooved keys interjacent said panel rows in said walls and at said intersections, said keys extending along said parting lines and at modular intervals apart therefrom, intermediate type stringers extending on said panels at intervals apart from said parting lines and reaching to said keys thereat, juxtaposed type stringers extending on each two of said panels at said parting lines and reaching to said keys thereat, said juxtaposed type stringers on said angularly meeting panels extending at an inclination thereto and reaching to said keys at said intersections diagonally across said intersections, and segmental tenoned sockets borne on said stringers of both types in a slidable and otherwise substantially immobile engagement with said keys, said sockets on said juxtaposed type stringers being jointly equivalent to one intermediate type stringer socket for permutative use of one stringer type with the same type apart from said parting lines, use of the other stringer type with the same type at coincident parting lines, and use of one type with the other type at non-coincident parting lines.

36. In a building structure, components and their relationships as set forth in claim 35, certain of said coextensive panel rows terminating with parting line edges and with two juxtaposed stringers thereat in opposition to each other, one of said keys being in engagement with said stringers sockets, a terminal member extending at said panel edges crosswise of said panels, a segmental tenoned socket borne on said member in a slidable engagement with said key jointly with said stringers sockets, said juxtaposed type stringers at said panel parting lines in said walls and at said intersections and at said terminating panels and said terminal member thereat having registering grooves therein, and a sealing strip lodged in said grooves and compressed therein by said key and socket engagement of said stringers and of said terminal member with the respective keys.

References Cited in the file of this patent
UNITED STATES PATENTS

| | | |
|---|---|---|
| 1,892,605 | Betzler | Dec. 27, 1932 |
| 2,091,061 | Waugh | Aug. 24, 1937 |
| 2,406,501 | Kratzmaier | Aug. 27, 1946 |

FOREIGN PATENTS

| | | |
|---|---|---|
| 793,334 | France | Nov. 16, 1935 |